(12) United States Patent
Lluncor et al.

(10) Patent No.: US 9,160,631 B1
(45) Date of Patent: Oct. 13, 2015

(54) SYSTEM AND METHOD FOR DISCOVERING IMPACTFUL CATEGORIES OF TRAFFIC IN LIVE TRAFFIC EXPERIMENTS

(71) Applicant: GOOGLE INC., Mountain View, CA (US)

(72) Inventors: David Edgar Lluncor, Mountain View, CA (US); Joel Darnauer, Mountain View, CA (US); Richard Charles Chiburis, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/335,462

(22) Filed: Jul. 18, 2014

Related U.S. Application Data

(63) Continuation of application No. 14/197,127, filed on Mar. 4, 2014.

(51) Int. Cl.
*G06F 17/30* (2006.01)
*H04L 12/24* (2006.01)
*G06F 3/0484* (2013.01)
*G06F 17/22* (2006.01)

(52) U.S. Cl.
CPC ............ *H04L 41/22* (2013.01); *G06F 3/04842* (2013.01); *G06F 17/2247* (2013.01)

(58) Field of Classification Search
CPC .......... G06F 17/30572; G06F 17/3089; G06F 3/04842; G06F 17/2247; H04L 41/22
See application file for complete search history.

(56) References Cited

U.S. PATENT DOCUMENTS

| | | | |
|---|---|---|---|
| 7,783,745 B1 * | 8/2010 | Bhargava et al. | 709/224 |
| 8,321,438 B1 * | 11/2012 | Smith et al. | 707/758 |
| 2003/0208457 A1 * | 11/2003 | Iyengar | 707/1 |
| 2008/0120543 A1 * | 5/2008 | Cahill et al. | 715/700 |
| 2008/0148225 A1 * | 6/2008 | Sarkar et al. | 717/107 |
| 2010/0049534 A1 * | 2/2010 | Whitnah et al. | 705/1 |
| 2010/0076724 A1 * | 3/2010 | Brown et al. | 702/179 |
| 2010/0131457 A1 * | 5/2010 | Heimendinger | 707/602 |
| 2011/0207430 A1 * | 8/2011 | Diaz Barroso et al. | 455/406 |
| 2013/0151655 A1 * | 6/2013 | Wu et al. | 709/217 |
| 2013/0238762 A1 * | 9/2013 | Raleigh et al. | 709/219 |
| 2013/0238777 A1 * | 9/2013 | Raleigh et al. | 709/223 |
| 2013/0246130 A1 * | 9/2013 | Michel et al. | 705/7.36 |
| 2013/0246609 A1 * | 9/2013 | Topchy et al. | 709/224 |
| 2013/0304915 A1 * | 11/2013 | Kawai | 709/224 |

* cited by examiner

*Primary Examiner* — Tarek Chbouki
(74) *Attorney, Agent, or Firm* — Birch, Stewart, Kolasch & Birch, LLP

(57) ABSTRACT

A system and method for summarizing changes between a first set of metrics and a second set of metrics are disclosed. An example method includes obtaining and categorizing a first set of metrics for an application. A second set of metrics for the application may be obtained and categorized. A statistical process may be used to determine metrics that should be displayed. Metrics may be organized into a metric tree data structure that is hierarchical including parent metrics and child submetrics. Metrics that have been determined to be displayed may be displayed in the tree data structure so that the metrics are selectable with a single user input. In response to receiving a selection of a metric via the single user input, traffic categories and submetrics may be displayed that are children of the metric within the tree data structure may be displayed.

26 Claims, 8 Drawing Sheets

| Experiment | CwSearch/ QF(event) | V(c)/ CwSearch | Q(c)/ CwSearch | RC/CwSearch | LRC/ CwSearch |
|---|---|---|---|---|---|
| Mobile Instant Gratify::Control (4006478) Total | N/A | 1.9727 | 5.6178 | 4.1150 | 1.8702 |
| Mobile Instant Gratify::NoAppacheControl (4006589) Total | N/A | 1.9712 -0.08% [-0.10,0.02]% | 5.6085 -0.17% [-0.37,0.04]% | 4.1158 0.02% [-0.17,0.21]% | 1.8776 0.39% [0.27,0.52]% |
| Mobile Instant Gratify::Control (4006478) United States | N/A | 2.0543 | 5.6077 | 3.8237 | 1.8420 |
| Mobile Instant Gratify::NoAppacheControl (4006589) United States | N/A | 2.0538 -0.02% [-0.10,0.14]% | 5.6015 -0.11% [-0.42,0.21]% | 3.8239 0.01% [-0.30,0.32]% | 1.8482 0.34% [0.07,0.61]% |
| Mobile Instant Gratify::Control (4006478) Japan | N/A | 2.3601 | 8.0187 | 6.9812 | 2.5242 |
| Mobile Instant Gratify::NoAppacheControl (4006589) Japan | N/A | 2.3616 0.06% [-0.25,0.37]% | 8.0169 -0.02% [-0.67,0.63]% | 6.9813 0.00% [-0.75,0.76]% | 2.5302 0.24% [-0.46,0.93]% |
| Mobile Instant Gratify::Control (4006478) United Kingdom | N/A | 2.1095 | 5.8144 | 4.3341 | 2.1183 |
| Mobile Instant Gratify::NoAppacheControl (4006589) United Kingdom | N/A | 2.1060 -0.17% [-0.65,0.33]% | 5.8038 -0.18% [-0.95,0.65]% | 4.3486 0.33% [-0.01,1.32]% | 2.1235 0.24% [-0.65,1.17]% |

FIG.1
CONVENTIONAL ART

```
metric_breakdowns {
root_name: "search::Queries(event)"
dimension_name: "slot"
children: "search::afectednonprefetchq"
children: "search::shownenterq"
children: "search::shownpauseonlyq"
children: "search::q→manref"
children: "search::qwclick"
children: "search::qwclick::qwrc"
children: "search::q→sugref"
}
```

FIG.4A

- Cookies: -0.55%
  - CwZwiebackReassign(%): +36.35%
- Queries(event): -1.22%
  - -3.53% due to AffectedNonPrefetchQ (-13.47%)
  - -2.16% due to ShownEnterQ (-24.62%)
  - -1.86% due to ShownClickNoEnterQ (-26.70%)
  - -1.03% due to ShownPauseOnlyQ (-21.17%)
  - -0.78% due to Q->ManRef (-2.53%)
  - -0.30% due to QwClick (-0.45%)
    - -0.49% due to QwRC (-0.82%)
  - +0.24% due to Q->SugRef (+2.40%)
- Interactions: +1.52%
  - +0.27% due to RC (+0.63%)
    - -0.08% due to PrimaryRC (-0.22%)
- JHomeToRC(s): +1.73%
- TTFRC: +1.33%
- GeoMeanSRT+IML: +3.73%

FIG.4B

Restrict to ⓘ

METRIC:

Clicks ▼

SLICES:

VE Type MainColumnResult... ▼

Browser Desktop;Chrome ▼

[ ▼ ]

FILTER BY Z-SCORE: ☑

In Comparison ⓘ

DATE RANGE:

2012-11-10 ▼ - 2013-11-09 ▼

DIMENSION:

Date ▼

PAIRS:

Overall change in RC = +0.11%
- RC: +0.11%
  ○ +0.12% due to ORC (+0.14%)
  ○ +0.12% due to PrimaryRC (+0.14%)
    ■ +0.05% due to VsPrimaryRC (+0.21%)

| Dimension | Slice | % of traffic | % of change within slice | Contribution to overall % change ▼ | Surprise z-score |
|---|---|---|---|---|---|
| tuning_region | China | 0.34 | 38.19 | 0.13 | 111.27 |
| ve_source | ORC | 90.62 | 0.14 | 0.12 | 6.61 |
| result_level | PrimaryRC | 88.40 | 0.14 | 0.12 | 6.45 |
| property_mode | Web Mode | 79.61 | 0.15 | 0.12 | 5.43 |
| psychic_query_type | Incapable | 46.16 | 0.20 | 0.09 | 3.26 |
| browser | MSIE8 | 5.10 | 0.39 | 0.02 | 3.60 |
| tuning_region | Russian Federation | 1.94 | 0.59 | 0.01 | 2.45 |
| property_mode | Books Mode | 0.03 | -1.34 | -0.00 | -2.47 |

FIG.5

| Metric | SlimLeft Contribution (% change) | SlimLeftNoStats Contribution (% change) |
|---|---:|---:|
| SESSION TRAFFIC METRICS | | |
| Cookies | -0.30% | -0.13% |
|   CwZeroRC | -0.06% (-0.95%) | -0.04% (-0.69%) |
|   HasAdSpamCookies | -0.03% (+0.68%) | -0.00% (+0.04%) |
| Queries(event) | -0.61% | -0.75% |
|   Singleton Queries | -0.43% (-1.08%) | -0.34% (-0.85%) |
|   QwManualSearchFromSRP | -0.20% (-0.81%) | -0.29% (-1.18%) |
|   QFromSuggestion0 | -0.15% (-1.19%) | -0.16% (-1.26%) |
|     QFromSuggestion0Prefetch | -0.13% (-1.53%) | -0.13% (-1.57%) |
|   Q->SugRef | -0.13% (-1.26%) | -0.23% (-2.20%) |
|   ShownClickNoEnterQ | -0.12% (-1.79%) | -0.12% (-1.82%) |
|   ShownHoverQ | -0.00% (-4.25%) | -0.00% (-0.10%) |
| SESSION WHOLE PAGE CLIC ... | | |
| Interactions | +1.47% | +1.89% |
|   InPageInfoReveal | +1.98% (+5.76%) | +2.38% (+6.92%) |
|   Interactions@2 | +0.36% (+2.53%) | +0.59% (+4.20%) |
|   Interactions@3 | +0.13% (+1.47%) | +0.32% (+3.62%) |
|   Interactions@9 | -0.04% (-2.21%) | -0.04% (-2.12%) |
|   Interactions@11 | -0.05% (-4.51%) | -0.05% (-4.68%) |
|   Interactions@10 | -0.05% (-2.84%) | -0.05% (-2.96%) |
|   Interactions@12 | -0.10% (-15.88%) | -0.10% (-15.85%) |
|   Interactions@15 | -0.11% (-41.30%) | -0.11% (-40.53%) |
|   Interactions@14 | -0.12% (-36.05%) | -0.12% (-35.63%) |
|   Interactions@13 | -0.12% (-33.27%) | -0.12% (-33.23%) |
|   Interactions@16Plus | -0.32% (-58.96%) | -0.31% (-58.09%) |
|   C | -0.59% (-0.90%) | -0.58% (-0.88%) |
|     RC | -0.47% (-0.80%) | -0.37% (-0.63%) |
|       ORC | -0.57% (-1.02%) | -0.40% (-0.73%) |
|     VsRC | -0.17% (-1.24%) | -0.10% (-0.71%) |
|       VsORC | -0.19% (-1.48%) | -0.11% (-0.82%) |
|   AC | +0.06% (+2.40%) | +0.00% (+0.08%) |

FIG.6

SYSTEM AND METHOD FOR DISCOVERING IMPACTFUL CATEGORIES OF TRAFFIC IN LIVE TRAFFIC EXPERIMENTS

PRIORITY STATEMENT

This application is a continuation of co-pending application Ser. No. 14/197,127 filed on May 4, 2014, and for which priority is claimed under 35 U.S.C. §120. The entire contents of the identified application are hereby incorporated by reference.

BACKGROUND

Software engineers often test new features and changes to their software applications before making the features and/or changes permanently available to application users. Testing helps engineers understand the effect of application changes on user traffic and the overall user experience.

When a software engineer tests an application change by running a live experiment using Internet or other network traffic, hundreds of metrics across several thousand different categories of traffic may be affected as illustrated in FIG. 1. For example, an experiment on an application could cause significant delays in user experience for users in a specific location, such as Japan. As shown in FIG. 1, an experiment may be run called "Mobile Instant Gratify" to decide if cache control affects the overall user experience. The application may be run once using cache control and another time without using cache control. Users in Japan may perform 50% fewer searches and have 50% fewer visits to the application when the application is run without using cache control as illustrated in FIG. 1 (101).

Customary systems can generate detailed statistics about application properties and user traffic to provide metrics about application performance. However, using customary techniques, analysts may need several hours to several days to explain one metric change. Analysts must create spreadsheets, aggregate data from multiple sources, and compute statistics by hand to determine if a particular change in traffic is significant to an experiment's analysis. Since there may be thousands of ways to categorize a user population and hundreds of metrics to measure, it is very difficult to determine the impact of a particular application change.

SUMMARY

This specification describes technologies relating to traffic analysis in general, and specifically to methods and systems for discovering significantly impacted categories of traffic for an application in live traffic experiments, or when comparing application traffic based on other criteria.

In general, one aspect of the subject matter described in this specification can be embodied in a system and method for summarizing changes between a first set of metrics for an application and a second set of metrics for the application. An example system includes: one or more processing devices and one or more storage devices storing instructions that, when executed by the one or more processing devices, cause the one or more processing devices to execute an example method. An example method includes: obtaining a first set of metrics for an application; categorizing the first set of metrics; obtaining a second set of metrics for the application; categorizing the second set of metrics; using a statistical process to determine metrics that should be displayed; organizing the metrics into a metric tree data structure that is hierarchical, including parent metrics and child submetrics; displaying the organized metrics in the tree data structure which have been determined to be displayed such that metrics are selectable with a single user input; and in response to receiving a selection of a metric via the single user input, displaying traffic categories and submetrics that are children of the metric within the tree data structure.

These and other embodiments can optionally include one or more of the following features. Using a statistical process to determine metrics that should be displayed may include calculating a z-score to identify a metric that deviates by more than a predefined amount between the first set of metrics and the second set of metrics. Displaying the organized metrics in the tree data structure may include presenting the metrics so that the impact of a child submetric on its parent metric is visible to the user. A modified z-score may be calculated to compare a change to a category of traffic for a metric with the average change in categories of traffic within the same metric. Displaying the organized metrics in the tree data structure may include a multiple experiments view which compares multiple different variations of an experiment in one report and displays the report to the user. Organizing metrics into a metric tree data structure may include creating synthetic categories of data by subdividing a user population of an experiment into subcategories and treating these subcategories as different experiments. Obtaining the first set of metrics or the second set of metrics may include obtaining data from data tables which contain at least one column of measure and one column of dimension. A column of dimension may be a text column. A column of measure may be a numeric field. A data table may be in relational database table format. A data table may be in CSV format. A data table may have a datafield to designate cookies that may be used for statistical inference. A configuration file may be received that includes the location of the data table, the format of the data, the mappings from internal names to display names for values of dimensions, metrics that are the ratio of two measures, and the structure of metrics. Displaying the organized metrics in the tree data structure may include displaying a user interface in a state which summarizes the user's selections for a default view of metrics. A particular metric category may be displayed when it is determined that the particular metric category's percent change is equal to or greater than the overall percent change for the metric. A particular metric category may be displayed when it is determined that the particular metric category's percent change is in the opposite direction from the overall change for the metric. A user interface display state may include restricting the user interface display by a particular metric, a category, a data range, or statistical filtering. A user may be allowed to change the default display state of the user interface.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

BRIEF DESCRIPTION OF THE DRAWINGS

FIG. 1 is a block diagram illustrating a conventional depiction of metrics from executing a test on an application.

FIG. 4a is an example metric tree structure.

FIG. 4b is an example executive summary of execution metrics as displayed by an example system.

FIG. 4c is an example menu for setting the state of an example user interface.

FIG. 5 is an example view of an example drill down screen in an example system.

FIG. 6 is an example view of a multiple experiments view in an example system.

DETAILED DESCRIPTION

As recognized by the inventors, there should be a way to quickly and easily find significant categories of traffic and metrics that are most affected by an application change. According to an example embodiment, a user interface may be created that summarizes changes in user traffic between a first set of metrics and a second set of metrics for an application. The first set of metrics may be a set of control metrics and the second set of metrics may be obtained when testing changes or new features for the application. The two sets of metrics may alternatively or additionally be from different application build dates or for different versions of the application running using different criteria such as: an application running in different countries, an application running in different browsers, or two versions of the application running different experiments. In order to summarize changes and show a user the most impacted metrics from a particular comparison, an example embodiment may provide a user with a user interface that allows the user to quickly and easily identify significant categories of traffic and/or metrics that were most affected between one version of the application and the other version. The user interface may additionally allow for automated drill-down of single metric changes.

Figure 2:
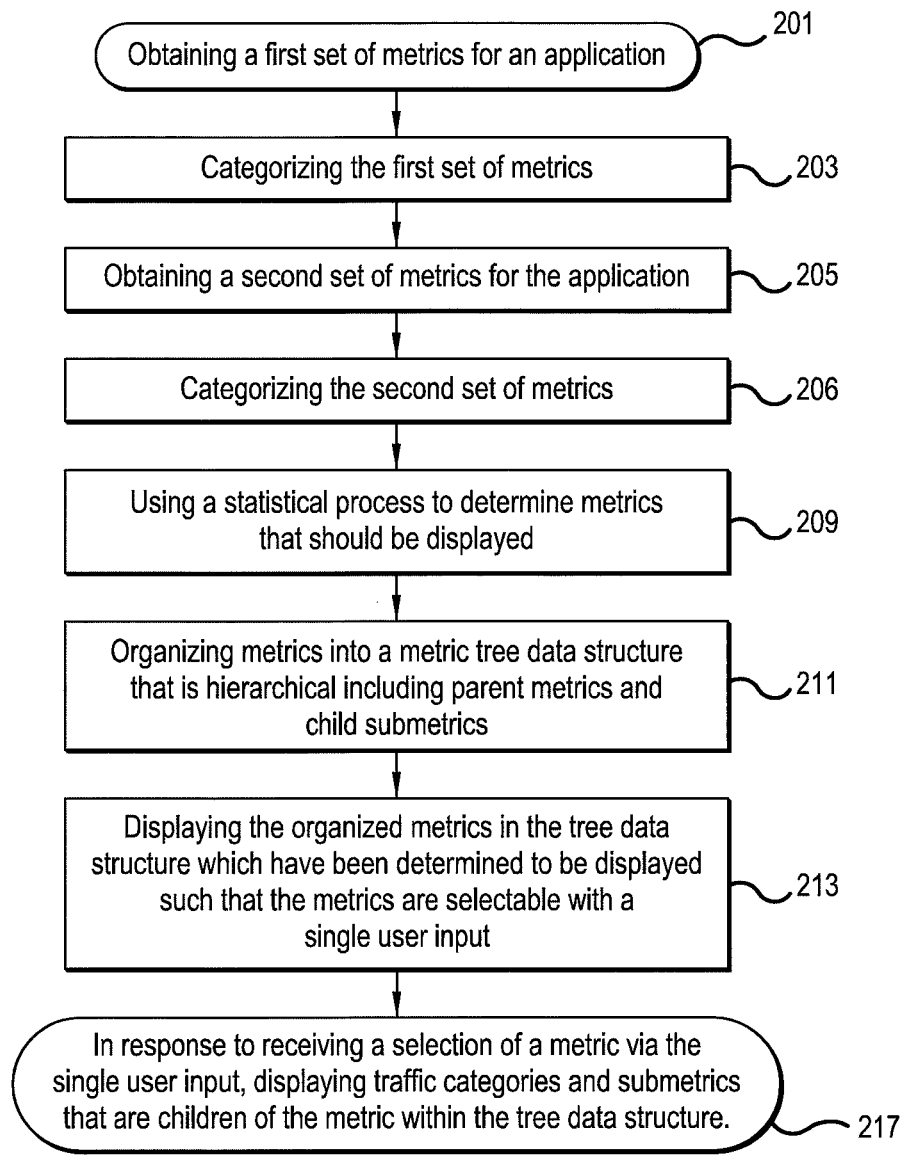
FIG. 2 is a flow diagram of an example method for discovering significantly impacted categories of traffic in live traffic experiments.

An example method may begin by obtaining a first and second set of metrics for an application as illustrated in FIG. 2 (201, 205). Metrics may be obtained by running an application with live user traffic. To facilitate performance analysis, an example system may collect data regarding an executing application and users' interaction with the application. For example, an application may produce trace log files to record each action, or event, that occurs as the application executes as well as the event's corresponding timestamp. An application may record several pieces of information, for example network requests, to measure user traffic. This data may be recorded in a trace log file. Additionally, an example system may record user interface information such as clicks or other interface interaction. Furthermore, an example system may use first party cookies to discern a web application's visitor behavior. Live traffic metrics may also be gathered from network and HTTP requests that contain a wide variety of information regarding users' experience with an application including user interface elements clicked by users and aspects of applications with which the users interacted.

In an example system, collected performance data may be used to measure specific properties and obtain metrics such as application load time, execution time, the number of queries executed by the application, and the number of links or advertisements that a user clicked on as the application was executing. There may be hundreds of metrics corresponding to the operation of multiple user interface components. User interface components may include search boxes and web results.

Metrics can be categorized based on several data characteristics (203, 206). For example, clicks on a user interface may be classified as ad clicks if they are clicks on advertisements. The ad clicks may be further categorized by the location of the advertisement on the user interface, such as right-hand-side ad clicks. User interface interaction may also be categorized by the country from which the user traffic originated. Therefore, metrics may be available to count all the right-hand-side ad clicks originating from, for example, users located in Japan or any other country, state, or location. These categorizations may also be referred to as slices.

Figure 3:
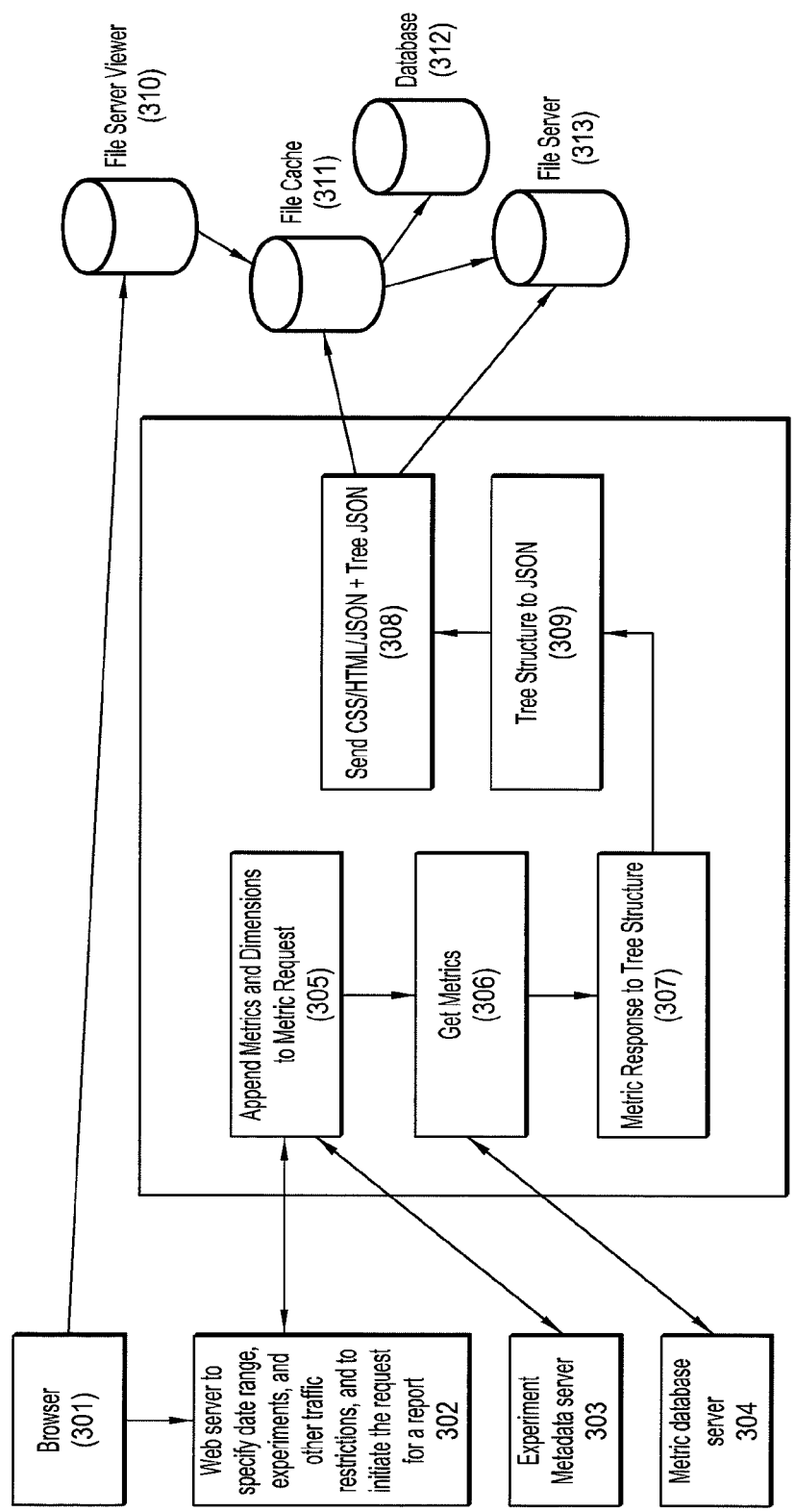
FIG. 3 is a block diagram illustrating an example system for discovering impactful categories of traffic in live traffic experiments.

A primary function of an example system may be to summarize changes among different executions of an application so that metrics may be compared among the different executions. To accomplish this function, an example system may receive a request for analysis of metrics from different executions of an application. For example, metrics may be analyzed for two executions of an application within a specific timeframe to be compared with each other via a browser as illustrated in FIG. 3 (301). When a user initiates a request from the browser (301) the request may be sent to a web server (302) to accept the request. The web server may also receive specific information about the application versions to compare including: date range, experiments, and traffic restrictions from the user. These metrics may be appended to the request as illustrated in FIG. 3, box 305.

An example request may include specific metrics which should be compared. However, an example system may compute over one hundred metrics automatically. These metrics may be part of a standard set of metrics for each experiment that are predetermined to be relevant to the type of experiment or application that is being executed. For example, there may be a standard set of metrics used for search applications. If a user requests metrics which are not part of the standard set, an example system may compute these metrics and display the metrics to the user. In some embodiments, only metrics with surprising changes may be displayed to an end user from the standard set of metrics.

The example system's server may split a request into multiple single control/experiment metric pairs that may have been specified by a user. Additional metrics from an experiment metadata server (303) may be appended to the request based on the request's associated application (305). The Experiment Metadata server may provide information about an experiment and/or the percentage of traffic that the experiment occupies so that an example system may normalize and equally compare a control to an experiment. Examples of added metrics may include ad-specific metrics such as revenue, impressions, and clicks on ads in various locations on the page may be requested for advertisement experiments. For video services, example metrics may include the number of video views and the average video watch time. These metrics may be automatically determined based on the type of experiment requested.

The example system may also pull possible metrics for an application experiment and compare them with the control metrics (307). These metrics may come from a metric database server (304). The metric database server (304) may compute the values of the automatically-determined metrics of box 305. For example, more than 100 metrics may be automatically pulled for search and ads experiments. The metrics may then be organized into a tree-like structure so that a user can correlate changes in metrics with categories of traffic and changes in the application (309). An example system may create a hierarchical tree structure which defines parent/child relationships among metrics. For example, a right-hand-side ad click may be a child of ad clicks. When a request includes ad clicks as a metric, an example system may fetch the child metrics underneath ad clicks, such as right-hand-side ad click, to help explain changes to this metric between a control run and the experimental run. In some embodiments, most of the work in building the metric trees may be done in the client code, e.g. JavaScript. Alternatively, trees may be built on the server.

An example server may have a static file that specifies the structure of the tree by defining the child metrics of each metric. The server may fetch all the metrics in the tree and pass the metric values and the contents of the static file to the client. The client may then assemble the metric values into a tree structure using the information in the file. In an example embodiment, there may be multiple possible trees because metrics can be divided into several different categories. For example metrics for clicks may be divided into application versus advertisement clicks and long versus short clicks. Long ad clicks may fit under ad clicks or long clicks. When a child metric has multiple possible parents, an example system may associate the child metric with the parent metric that has the most similar metrics to make it more likely that the child will be pruned since an example system may want to show only the most surprising metrics.

In an example embodiment, the tree structure may contain categories of metrics which can be used to analyze and identify metric changes. The tree of metrics and child metrics may come from a single view of a database. Metric categories may be created by using several different tables from a database to compute interesting slices of metrics such as country, browser, or search mode for the each metric. Metric slices may also be synthetically created from subdividing a user population of an application. For example, an application experiment may be run, which turns a background page of the application red. Metrics from the experiment may be collected for user traffic. The user population may be subdivided into mobile users and desktop users. These two synthetic slices or groups of users may be compared to see how changing the page background color affected each user group. Metric slices may be combined to create the hierarchical tree structure. For example, all clicks across all countries may be computed to obtain total clicks. The structure of slices within the tree hierarchy may help a user visualize metric changes and allow the user to attribute metric changes to a specific metric category. For example, changes to revenue in Asia during a particular execution of an application may be traced to changes in revenue in Japan specifically.

A ratio metric may be computed, which is a ratio of two counts such as clicks and queries. An example system may need to know the number of clicks and also the number of queries in order to determine how much of the total change in the ratio metric can be explained by a single slice of data, such as the clicks and queries from Japan. Furthermore, metrics may be organized in an order that makes it easy for a user to review the results. As discussed, metrics may be organized into multiple trees. These trees may be displayed in a specific order. For example, in one example embodiment, search experiments may be shown by the number of users, then the number of queries, followed by the number of interactions (e.g. clicks). Each of these metrics may have many child metrics that are also organized into a tree. The tree structure may contain or pass information to an example frontend part of the system about how each category contributes to each metric's overall change.

A representation of the metrics and statistical data may then be saved to a file (308, 311-313). JavaScript Object Notation (JSON) variables, or other programming objects, may be used to represent control and experiment metrics and create trees. An example file may include example trees, the structure of metrics and their relationships, a short name identifying the experiments, and details about the request. A file system may also obtain details about how to display the tree and statistics in the frontend using HTML, CSS, and/or JavaScript. The information may be stored in one or more files in a directory on a file system (313).

Once data has been saved to the file system, an example system's frontend client may be able to provide a user interface, which summarizes changes among different executions of an application. A predefined value may be set to determine whether a change is significant. Categories of traffic that deviate by more than the predefined amount between a first set of metrics and a second set of metrics may be considered significant. A statistical process, as discussed below, may be used to determine metrics which are significant (209). The frontend may obtain the data and display files from the file system and use logic and the predetermined value to filter insignificant categories. For example, a user's browser (301) may retrieve the data and display the tree structure from a file server viewer (310). An example system may use control metrics as base metrics to determine whether there has been a significant change in an application's execution. If metrics from an application execution deviate by more than a predefined amount from the control metrics of the application's execution, an example system may determine that there has been a significant change and display the metrics that deviate by more than a pre-defined amount to a user.

The frontend may also organize the metrics into trees using the structure of metrics file to create a tree data structure that is hierarchical and includes parent metrics and child submetrics (211). An example structure of a metrics file is illustrated in FIG. 4a. This structure represents the category "Queries (event)" and shows the sub-categories as children. An example embodiment may only show, for example, five of the possibly forty-three related to Queries if the system determines that the other submetrics are not statistically significant. Determining statistical significance may be done in several ways including using a z-score and/or a modified z-score as discussed below.

Reducing the number of metrics to display may improve efficiency in loading data to display. This reduction may also assist analysts in analyzing metric results. The user interface implementation of the structure represented by FIG. 4a is shown in FIG. 4b. Although an example system includes organization and filtering in the frontend client, some embodiments may perform filtering or organization of the data on the server before the files are saved.

A z-score may be used to filter portions of traffic which deviate significantly between a first set and second set of metrics based on a calculated average deviation. For example, z-score values greater than 2.093 or less than −2.093 may indicate outliers with 95% confidence.

In an example system, a search engine website may have seen a decrease in traffic by 0.07% between a first and second testing of the website in all regions except Japan, which may have had a decrease of 21.64%. A z-score may be calculated for the change noticed in Japan by using the following formula: $z_{score} = x - \mu_0 / \sqrt{\sigma^2}$. Other countries may have smaller z-scores and may be filtered from the frontend.

In the formula, a null hypothesis ($\mu_0$) is subtracted from a percent change(x). In this example, the percent change is 21.64% and the null hypothesis may be 0. The result of the subtraction may be divided by the standard deviation of that percent change. When the absolute value of the z score is greater than a predetermined amount such as 2.093, the example system may determine that there is a significant change in the metric or slice. Z-scores may be used to identify metrics that deviate by more than a predefined amount between a first and second set of metrics.

The actual significance of a metric deviation may be determined by calculating a modified z-score. The modified z-score may be used to determine the significance of a category of traffic for a metric with respect to other categories of traffic for the metric.

An example modified z-score may be calculated using the following formula:

$$z_{modified} = \frac{x_s - \mu_t}{\sqrt{\sigma_s^2 + \sigma_t^2}}$$

In the formula, $x_s$ is the point estimate for the percent change within a particular category of traffic for a metric, $\mu_t$ is the point estimate for the percent change of categories of traffic for the metric excluding the particular category of traffic chosen, $\sigma_s^2$ is the sample variance of the metric's percent change, and $\sigma_t^2$ is the sample variance of the rest of the metric's category of traffic's percent change.

In the above example, $x_s$ is $-21.64$, $\mu_t=-0.07$, $\sigma_s^2=0.06$, and $\sigma_t^2$ is 0.02. Using the sum of variances from the search engine website in Japan and the search engine website outside Japan, the modified z-score of $-273.01$. The absolute value of the modified z-score may be taken yielding 273.01. Then, the result may be compared with the predetermined value, 2.093. Since 273.01 is greater than 2.093, the search engine website category for Japan may be surprising relative to the rest of the traffic. In an example embodiment, a user might look at less than five countries to find that Japan is a surprising slice or category of traffic. To find the same information in a conventional system, it may require looking through all 195 countries. An example system may be able to surface the surprising information to the first page of a metrics display whereas conventional experiment analysis tools require analysts to guess which country might have a large impact on the metric.

Z-score is a score used in statistical analysis. A modified z-score is a variation on the traditional z-score, which allows an example system to compare a change to a category of traffic for a metric to the average change in categories of traffic within the same metric. Conventional tools may compare a category of traffic for a metric to 0 using a z-score process. A modified z-score may be used in addition or alternatively to a z-score process. An example system may use a z-score to find interesting metrics and then may use a modified z-score to find the category that makes the metric interesting. An example system may compare a category of traffic for a metric with other categories of traffic for the same metric. For example, x1 may equal the percent change in a metric for all countries and x2 may equal the percent change in the metric for only Japan. For Japan, a z-score may equal (x2−0)/a standard deviation. A modified z-score may equal (x2−x1)/a standard variation in the percent change of this metric.

In addition to a z-score and a modified z-score, an example embodiment may apply two other conditions when filtering metrics and categories. First, a particular category's percent change should be more extreme than the overall percent change for a particular metric. For example, a category may have a −0.05% change, but the overall percent change may be −1.8% An overall percent change may be calculated for each metric as the total change for particular metric being considered. This total change may include all user traffic affecting a metric rather than just traffic from a particular country or browser. The overall percent change may be pulled directly from the database or may be computed by adding all traffic together for a particular metric. If the category's change is less extreme than the overall percent change, the category may be filtered out of the results list for potential performance issues.

Second, a metric may also be considered surprising and therefore included in the displayed results list for potential performance issues when a category's metric moves in the opposite direction from the overall change. For example, an application's user traffic may go up by 0.2% on tablet devices, but drop 1.8% on all other devices. This tablet category of traffic is significant relative to the overall 1.8% drop and should therefore be included in the results displayed to a user.

These conditions may be used to compute a measurement of a particular category's contribution to a metric's overall percent change. The contribution to a metric's overall percent change may be calculated several ways per slice. For example, for a count metric such as clicks, the contribution of a country, e.g. Japan, to overall percent change may be the result of the number of experiment clicks in the country minus the number of control clicks in the country. This number may be divided by the total number of control clicks and then multiplied by one hundred. The resulting number may show how much the total would have changed if only the country changed and everything else had stayed constant. For a ratio metric, such as clicks per queries, one way to calculate contribution may be to first calculate an experiment ratio by dividing experiment clicks in a particular country by the total experiment queries. A control ratio may be calculated by dividing control clicks in the country by the total number of control queries. The control ratio may then be subtracted from the experiment ratio. The number resulting from the subtraction may be divided by a total control ratio, which is the ratio of total control clicks to total control queries, to obtain a final result for the ratio metric.

After statistical data has been filtered and organized, it may be displayed to a user via HTML, Javascript, or some other webpage scripting language. A frontend display may include an executive summary that may display the key metrics and submetrics that changed from the control to the experimental execution of an application as shown in FIG. 4b. Other statistical analysis may be available along with the executive summary.

An example frontend display may allow for metric drill-down so that a user may understand the slices that explain any metric changes. Metrics may be organized and divided so that only metrics determined to be significant are displayed to a user and individual metrics are selectable with a single user input such as a mouse click (213). When a metric is selected via the single user input, traffic categories, groups, submetrics, and/or slices that contribute to the metric, or are in some way related to the metric, may be shown to a user (217).

A tree view may show how sub-metrics explain changes in metrics, and a drill-down table may explain changes in metrics in terms of both sub-metrics and also slices such as country or browser. For example, as shown in FIG. 5, a user may see that a metric for "result clicks" is up by 0.11% (501). By drilling down into this metric, the user may see that the traffic from China contributes the most to the overall percent change of the result clicks metric.

In some embodiments, metrics and/or the executive summary of comparisons among an application's different executions may be copied into emails and analysis reports to provide software engineers and other analysts with the information.

An example system may run on any general data tables provided by a user. General data tables may include columns of measures (e.g. the number of queries) and columns of dimensions (e.g. country). Any text column may be assumed to be a dimension and any numeric field (other than the cookie bucket column discussed below) may be assumed to be a metric. Tables may be in several different formats such as relational database tables or CSV files. Each row may specify the value of the measures on the given dimensions. Dimensions may be summable or non-summable. In a summable dimension, the total value of the measures may be obtained by adding the measure values across all values of the dimension. In a non-summable dimension, a specific value of the dimension may be designated as the row total. Non-summable dimensions may have a "total_slice" specified for them in the configuration file discussed below. In some embodiments, a data table may have a data field specified as a "bucket" to designate cookies buckets that may be used for statistical inference.

In order to run an example system on a general data table, a user should create a configuration file that includes: the location of the data table and the data table's format; the mappings from internal names to display names for values of dimensions; metrics that are the ratio of two measures such as Clicks per Queries; and the structure of metrics.

As discussed above, an example system displays a navigation user interface to summarize changes in user traffic for an application and allow for automated drill-down of single metric changes. An example system may internally store a state which summarizes the user's selections for a default view of the metrics. A user interface may be restricted by several different pieces of information including: metrics, slices, date range, and statistical filtering. If a user interface is restricted by metric, only information regarding that particular metric is displayed to the user. If a user interface is restricted to certain slices, only those slices are shown to the user. Restricting a user interface by a date range means that only metrics from within the specified date range will be displayed. If statistical filtering is enabled, only statistically significantly surprising data slices are shown.

As illustrated in FIG. 6, an example system may allow viewing of multiple versions of an experiment at the same time. Multiple different variations of the experiment can be compared. For example, a user may be able to compare the metrics of a webpage when spacing increases by one pixel, two pixels, three pixels, etc. In addition to different variations of an experiment, multiple categories or groups may be compared.

For example, one or more pairs of slices may be specified to be compared with one another. These slices may be known as comparison groups. Each pair may contain a base group and a treatment group. For example, the user may compare metrics obtained from two different dates. These two dates would be a comparison group. An example user interface may specify a state in which only the comparison group metrics were displayed. In an example embodiment, a user may be able to change the state of the user interface display by using a side menu as shown in FIG. 4c or by making selections within a main view as illustrated in FIG. 4b. When a user changes the state by clicking user interface elements, a request may be initiated to a data service that results in the main tree and table views being updated. An application controller may send the request to the data service, which may pass the request to a table service. An example request may contain the information about the state. A table service may query the general data table and return information such as dimension, slice, measure, group, bucket, and value. Dimension may specify that a returned row is sliced along the dimension. A slice may specify the slice in the given dimension that the row represents. Measure and/or group may identify the measure and/or group for which the row exists. Bucket may specify the cookie bucket and value may provide the value of the measure in the given slice, group, and bucket. If no metric is requested in the state, no slicing may be done. Instead all measures may be returned for each cookie bucket and each of the groups in the state. If a metric was requested in the state, only measures that are components of that metric or a submetric (subcategory) of that metric may be returned. As discussed above, the structure of the requested metrics may be specified in the configuration file. For measures that are components of a requested metric, an example system may return metrics for each slice in each dimension. In some embodiments, only one dimension may be returned at a time.

An example data service may then take the table returned by the table service and aggregate the group and cookie-bucket information together. Measures may also be combined into metrics. A set of "metric nodes" may be returned for each metric and slice. A metric node may contain information such as: which metric and slice the node represents; the value of the metric in the base and treatment group, as well as values of the numerator and denominator if the metric is a ratio of two measures; cookie bucket values contributing to the numerator and denominator for both the base and treatments groups; percent change in the metric between the base and the treatment groups; and a confidence interval for the percent change in the metric between the base and the treatment groups.

Figure 7:
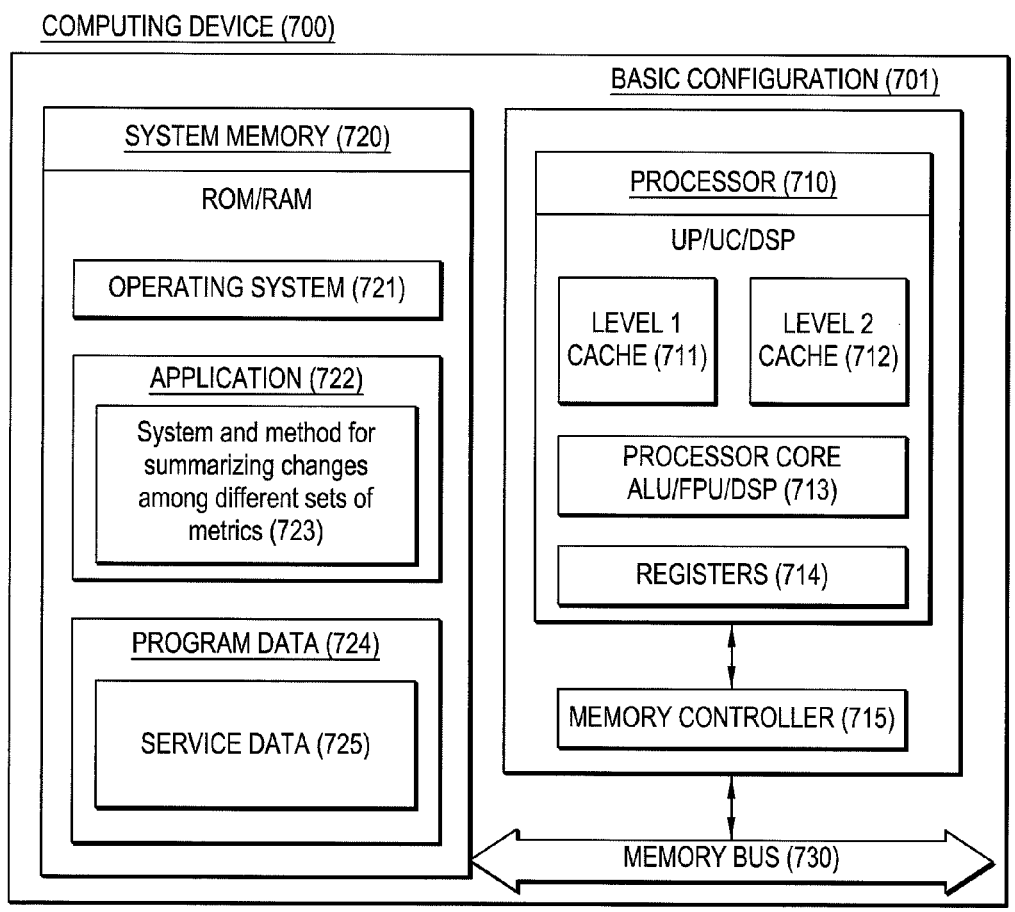
FIG. 7 is a block diagram illustrating an example computing device.

FIG. 7 is a high-level block diagram showing an application on a computing device (700). The application determines impactful categories of traffic in live traffic experiments. In a basic configuration (701), the computing device (700) typically includes one or more processors (710), system memory (720), and a memory bus (730). The memory bus is used to perform communication between processors and system memory.

Depending on different configurations, the processor (710) can be a microprocessor (μP), a microcontroller (μC), a digital signal processor (DSP), or any combination thereof. The processor (710) can include one or more levels of caching, such as an L1 cache (711) and an L2 cache (712), a processor core (713), and registers (714). The processor core (713) can include an arithmetic logic unit (ALU), a floating point unit (FPU), a digital signal processing core (DSP Core), or any combination thereof. A memory controller (716) can either be an independent part or an internal part of the processor (710).

Depending on the desired configuration, the system memory (720) can be of any type including, but not limited to, volatile memory (such as RAM), non-volatile memory (such as ROM, flash memory, etc.) or any combination thereof. System memory (720) typically includes an operating system (721), one or more applications (722), and program data (724). The application (722) may include a system and method for identifying impactful categories of traffic in live traffic experiments or when comparing different versions of an application. Program Data (724) includes storing instructions that, when executed by the one or more processing devices, implement a system and method for summarizing changes between a first set of metrics for an application and a second set of metrics for the application. In some embodiments, the application (722) can be arranged to operate with program data (724) on an operating system (721).

The computing device (700) can have additional features or functionality, and additional interfaces to facilitate communications between the basic configuration (701) and any required devices and interfaces.

System memory (720) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device (700). Any such computer storage media can be part of the device (700).

The computing device (700) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that includes any of the above functions. The computing device (700) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples, can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and/or firmware would be well within the skill of one skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity. Furthermore, the terms "slice," "category," and "group" are used interchangeably throughout the specification.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for summarizing changes between a first set of metrics for an application and a second set of metrics for the application, the method comprising:
    obtaining the first set of metrics for the application;
    categorizing the first set of metrics;
    obtaining the second set of metrics for the application;
    categorizing the second set of metrics;
    using a statistical process to determine metrics that should be displayed;
    organizing the metrics into a metric tree data structure that is hierarchical, including parent metrics and child submetrics;
    displaying the organized metrics in the tree data structure which have been determined to be displayed such that metrics are selectable with a single user input; and
    in response to receiving a selection of a metric via the single user input, displaying traffic categories and submetrics that are children of the metric within the tree data structure
    wherein obtaining the first set of metrics or the second set of metrics includes obtaining data from data tables which contain at least one column of measure and one column of dimension and wherein a configuration file is received that includes the location of the data table, the format of the data, the mappings from internal names to display names for values of dimensions, at least one formula for a metric that is the ratio of two measures, and the structure of the first and second set of metrics.

2. The method of claim 1, wherein using a statistical process to determine metrics that should be displayed includes calculating z-scores to identify metrics that deviate by more than a predefined amount between the first set of metrics and the second set of metrics.

3. The method of claim 1, wherein displaying the organized metrics in the tree data structure includes presenting the metrics so that the impact of a child submetric on its parent metric is visible to the user.

4. The method of claim 2, further comprising calculating a modified z-score to compare a change to a category of traffic for a metric with the average change in categories of traffic within the same metric.

5. The method of claim 1, wherein displaying the organized metrics in the tree data structure includes a multiple experiments view which compares multiple different variations of an experiment in one report and displays the report to the user.

6. The method of claim 1, wherein organizing metrics into a metric tree data structure includes creating synthetic categories of data by subdividing a user population of an experiment into subcategories and treating these subcategories as different experiments.

7. The method of claim 1, wherein a column of dimension is a text column or a column of measure is a numeric field.

8. The method of claim 1, wherein the data table is in relational database table format or in CSV format.

9. The method of claim 1, wherein the data table has a datafield to designate cookies that is used for statistical inference.

10. The method of claim 1, wherein displaying the organized metrics in the tree data structure includes displaying a user interface in a state which summarizes the user's selections for a default view of metrics.

11. The method of claim 10, wherein the state includes restricting the user interface display by a particular metric, a category, a date range, or statistical filtering.

12. The method of claim 10, further comprising allowing a user to change the default display state of the user interface.

13. The method of claim 1, further comprising:
determining that a particular metric category's percent change is either equal to or greater than the overall percent change for the metric or in the opposite direction from the overall change for the metric, and
displaying the particular metric category.

14. A system for summarizing changes between a first set of metrics for an application and a second set of metrics for the application, the system comprising:
one or more processing devices and
one or more storage devices storing instructions that, when executed by the one or more processing devices, cause the one or more processing devices to:
obtain the first set of metrics for the application;
categorize the first set of metrics;
obtain the second set of metrics for the application;
categorize the second set of metrics;
use a statistical process to determine metrics that should be displayed;
organize the metrics into a metric tree data structure that is hierarchical, including parent metrics and child submetrics;
display the organized metrics in the tree data structure which have been determined to be displayed such that metrics are selectable with a single user input; and
in response to receiving a selection of a metric via the single user input; display traffic categories and submetrics that are children of the metric within the tree data structure
wherein obtaining the first set of metrics or the second set of metrics includes obtaining data from data tables which contain at least one column of measure and one column of dimension and wherein a configuration file is received that includes the location of the data table, the format of the data, the mappings from internal names to display names for values of dimensions, at least one formula for a metric that is the ratio of two measures, and the structure of the first and second metrics.

15. The system of claim 14, wherein using a statistical process to determine metrics that should be displayed includes calculating z-scores to identify metrics that deviate by more than a predefined amount between the first set of metrics and the second set of metrics.

16. The system of claim 15, further comprising calculating a modified z-score to compare a change to a category of traffic for a metric with the average change in categories of traffic within the same metric.

17. The system of claim 14, wherein displaying the organized metrics in the tree data structure includes presenting the metrics so that the impact of a child submetric on its parent is visible to the user.

18. The system of claim 14, wherein displaying the organized metrics in the tree data structure includes a multiple experiments view which compares multiple different variations of an experiment in one report and displays the report to the user.

19. The system of claim 14, wherein organizing metrics into a metric tree data structure includes creating synthetic categories of data by subdividing a user population of an experiment into subcategories and treating these subcategories as different experiments.

20. The system of claim 14, wherein a column of dimension is a text column or column of measure a numeric field.

21. The system of claim 14, wherein the data table is in relational database table format or in CSV format.

22. The system of claim 14, wherein the data table has a datafield to designate cookies that may be used for statistical inference.

23. The system of claim 14, wherein displaying the organized metrics in the tree data structure includes displaying a user interface in a state which summarizes the user's selections for a default view of metrics.

24. The system of claim 23, wherein the state includes restricting the user interface display by a particular metric, a category, a data range, or statistical filtering.

25. The system of claim 23, further comprising allowing a user to change the default display state of the user interface.

26. The system of claim 14, further comprising:
determining that a particular metric category's change is either equal to or greater than the overall percent change for the metric or in the opposite direction from the overall change for the metric, and
displaying the particular metric category.

* * * * *